United States Patent [19]

Rumyantsev et al.

[11] 4,131,184
[45] Dec. 26, 1978

[54] VEHICLE HYDRAULIC TRANSMISSION

[75] Inventors: Leonid A. Rumyantsev; Jury K. Esenovsky-Lashkov, both of Moscow; Vasily T. Avershin, Brysansk; Vladimir Y. Ilnitsky, Brysansk; Ivan L. Jurin, Bryansk, all of U.S.S.R.

[73] Assignees: Tsentralny Nauchno Issledovatelsky Avtomobilny i Avtomotorny Institut Nami, Moscow; Proizvodstvennoe Obiedinenie "Baz", Bryansk, both of U.S.S.R.

[21] Appl. No.: 820,688

[22] Filed: Aug. 1, 1977

[51] Int. Cl.² .................. F16D 47/06; F16H 41/18
[52] U.S. Cl. .................... 192/3.26; 192/3.3; 192/91 R; 192/103 FA; 192/3.58
[58] Field of Search ............ 192/3.25, 3.26, 3.27, 192/3.3, 3.31

[56] References Cited
U.S. PATENT DOCUMENTS

| 2,707,887 | 5/1955 | Slack | 192/3.3 X |
| 2,709,926 | 6/1955 | Jandsek | 192/3.3 X |
| 2,950,630 | 8/1960 | Zeidler | 192/3.26 X |
| 3,313,181 | 4/1967 | Leonard et al. | 192/3.27 X |

Primary Examiner—Benjamin W. Wyche
Attorney, Agent, or Firm—Fleit & Jacobson

[57] ABSTRACT

A vehicle drive transmission comprising an air released main clutch connected between a torque convertor and multiple ratio gear transmisson. A lock up clutch for the convertor turbine and impeller is engaged by hydraulic pressure when an engine drive governor reaches a predetermined speed and opens a governor valve. The main clutch is released by a motor controlled by a solenoid valve which selectively connects the motor to a source of air pressure or to atmosphere via a restricted orifice and a normally closed air inlet valve. The restriction retards the engagement of the main clutch when the engine is rotating below the predetermined speed, and above said predetermined speed, the governor valve opens to engage the lock-up clutch and to open the air inlet valve whereby the main clutch may be engaged at a faster rate.

3 Claims, 4 Drawing Figures

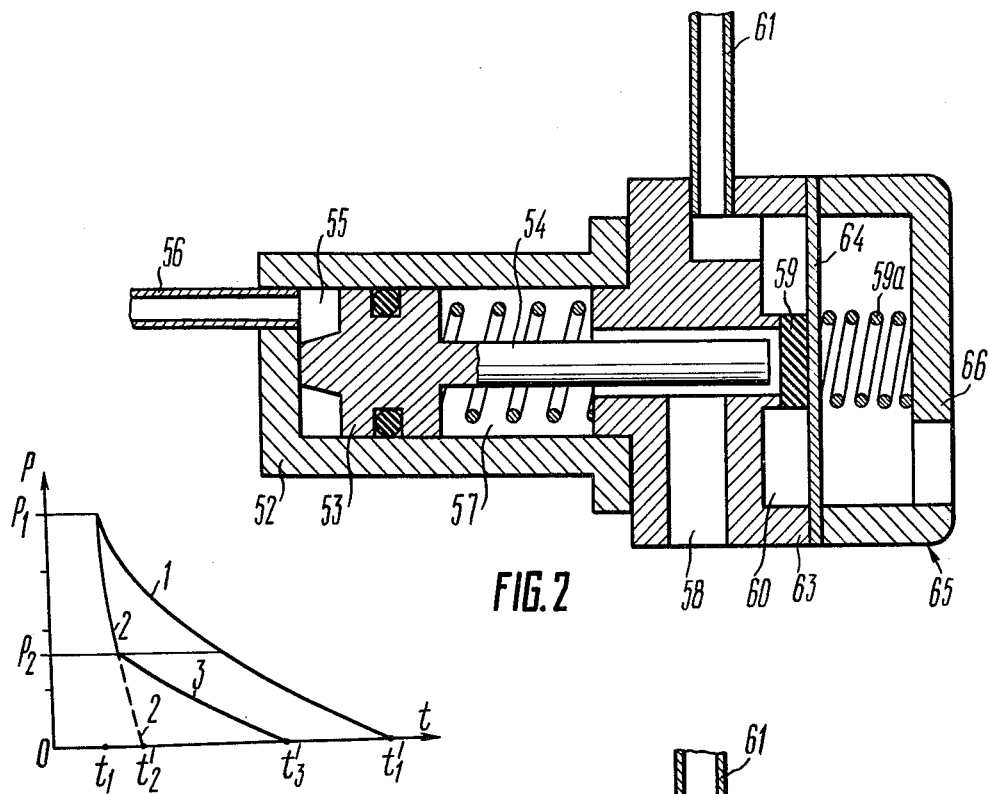
FIG. 2
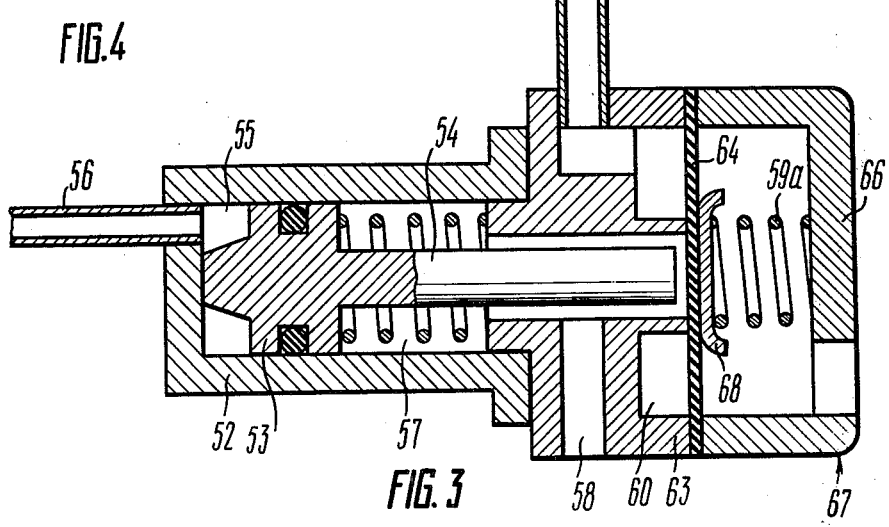
FIG. 4
FIG. 3

VEHICLE HYDRAULIC TRANSMISSION

The present invention relates to vehicles and has particular reference to hydraulic transmissions used therein.

Hydraulic transmissions constructed according to the present invention can be used most advantageously in motor vehicles.

Known in the art are vehicle hydraulic transmissions comprising a clutch and a hydraulic torque converter kinematically connected to each other. The torque converter impeller and turbine are connected respectively to the vehicle engine shaft and to the clutch shaft and the torque converter incorporates a direct drive clutch designed to lock said impeller and turbine together.

The torque converter direct drive clutch comprises a friction disk connected to the turbine and has a pressure plate which, in conjunction with the impeller, forms a variable-volume chamber communicating with a source of hydraulic fluid pressure via a valve operated in response to a signal from a vehicle engine shaft speed pickup. The torque converter space formed by the impeller and turbine communicates with the same source of hydraulic fluid pressure via said valve.

For engaging and disengaging the transmission clutch provision is made of an arrangement including a power cylinder whose moving member (piston) is mechanically connected with the transmission clutch pressure plate. The cylinder alternately communicates with an air pressure source through a valve and with the atmosphere through a throttling orifice, said valve being controlled by the driver in the process of making gearchange.

In the hydraulic transmission under consideration, engagement of the transmission clutch is effected by connecting the power cylinder to the atmosphere and disengagement of the transmission clutch is effected by connecting the power cylinder to the source of pressure. Inasmuch as the connection of the power cylinder to the atmosphere is effected by virtue of a constant-area throttling orifice, the pressure in the power cylinder during transmission clutch engagement varies at a constant rate irrespective of the mode of torque converter operation. In consequence, considerable slip of the transmission clutch friction elements occurs at a comparatively high engine shaft speed, causing rapid wear of the clutch friction elements and thus shortening the life of the hydraulic transmission.

It is an object of the present invention to provide a vehicle hydraulic transmission the clutch of which is operated by a power cylinder wherein variation of air pressure during clutch engagement is correlated with the mode of torque converter operation.

It is a further object of the present invention to increase the life of the vehicle involved.

It is a still further object of the present invention to enhance the torque-speed characteristics of the hydraulic transmission in virtue of reducing the transmission clutch engagement time.

These and other objects are achieved in a vehicle hydraulic transmission comprising a clutch and a hydraulic torque converter kinematically connected to each other. A direct drive clutch is provided in the torque converter for the purpose of locking together the impeller and turbine thereof, which direct drive clutch is controlled by hydraulic fluid pressure in response to a signal from the vehicle engine shaft speed pickup. The hydraulic transmission also comprises a transmission clutch engaging and disengaging arrangement which includes a power cylinder whose movable member is mechanically connected to the operating member of the transmission clutch. Said power cylinder is adapted to be alternately connected to an air pressure source via a positively controlled valve and to the atmosphere via a throttling orifice. According to the invention, said power cylinder has a further provision for communication with the atmosphere by the agency of a valve arrangement which is connected to said positively controlled valve and is actuated by hydraulic fluid pressure in response to a signal from the vehicle engine shaft speed pickup.

It is desirable that said valve arrangement should comprise a cylinder accommodating a piston with a piston rod. It is further desirable that said valve arrangement be adapted for hydraulic fluid to be fed under pressure into the piston end of the cylinder in response to a signal from the vehicle engine shaft speed pickup. It is still further desirable that the rod end of the cylinder be in constant communication with the atmosphere and a spring-loaded valve adapted to interact with the free end of the piston rod be provided for the purpose of separating said rod end of the cylinder from a space formed by the cylinder and a cover fitted thereto, said space being in communication with the transmission clutch power cylinder.

The construction of the valve arrangement described above is simplest and most reliable in operation.

It is still further desirable that the cover of the valve arrangement be made of a resilient material and rigidly connected to the valve.

The use of a resilient material for the cover and the rigid connection of the cover to the valve further increase the life of the hydraulic transmission.

The present invention provides a hydraulic transmission which enables the vehicle involved to move off smoothly from rest and at the same time renders high tractive effort and speed performance, the hydraulic transmission featuring increased operating reliability and service life.

Now the invention will be described in detail with reference to the accompanying drawings in which:

FIG. 2 shows another embodiment of the valve arrangement.

FIG. 3 shows still another embodiment of the valve arrangement.

FIG. 4 is a graph of pressure variation in the power cylinder during transmission clutch engagement.

Figure 1:
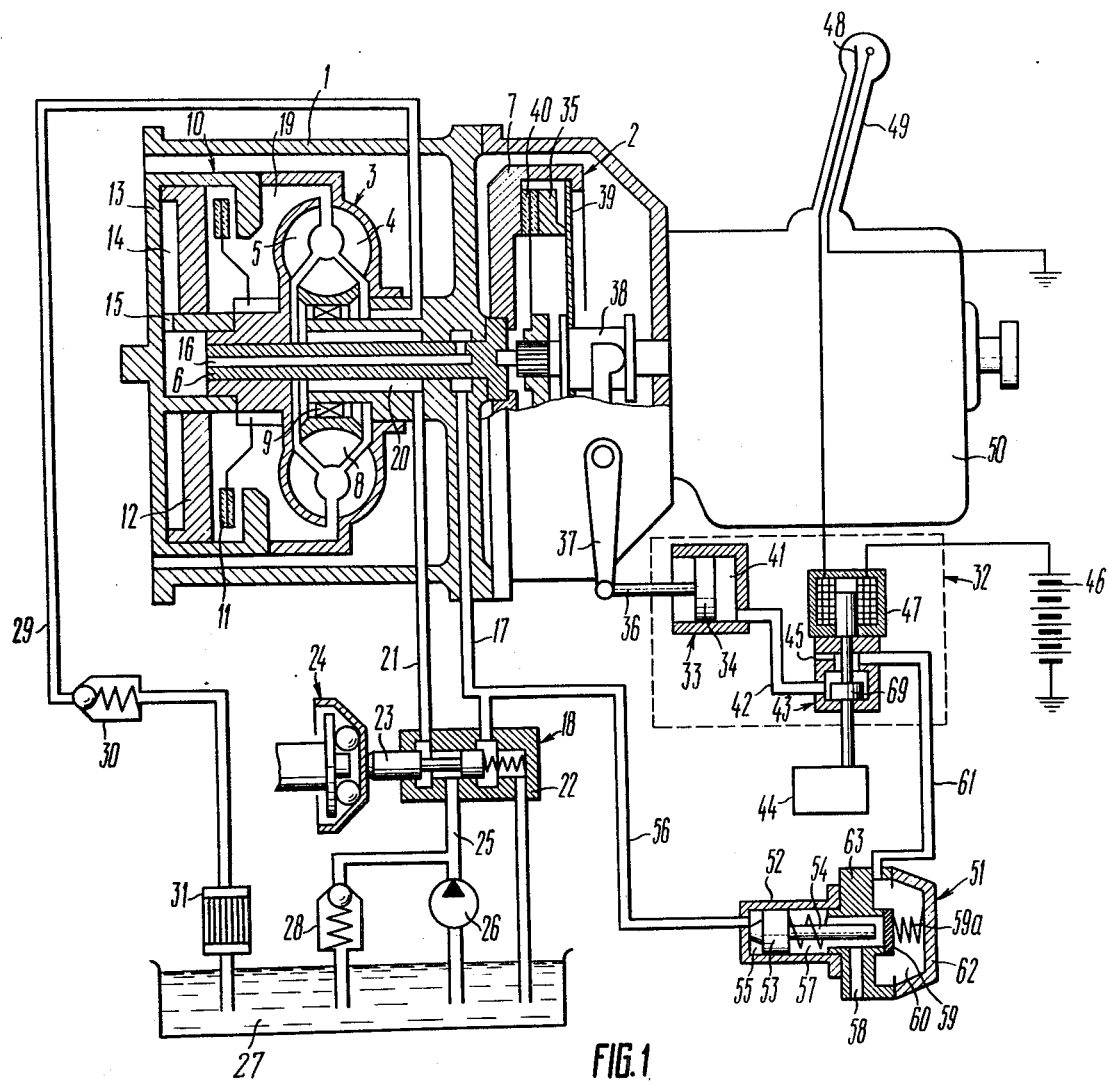
FIG. 1 is a schematic diagram of the vehicle hydraulic transmission constituting the present invention, the valve arrangement thereof being constructed according to one of the possible embodiments.

The hydraulic transmission constituting the present invention comprises a casing 1 (FIG. 1) which accommodates a transmission clutch 2 and a hydraulic torque converter 3. The vehicle engine shaft (not shown) is connected to the impeller 4 of the torque converter 3. The turbine 5 of the torque converter 3 is fixedly mounted on a shaft 6 which is attached to the flywheel 7 of the transmission clutch 2. The stator 8 of the torque converter 3 is connected to the casing 1 through a freewheel 9. The torque converter 3 incorporates a direct drive clutch 10 designed to lock solid the impeller 4 and the turbine 5. The direct drive clutch 10 incorporates a disk 11 which is mounted on the turbine 5 and adapted for axial movement. A pressure plate 12 is mounted inside a casing 13 which is rigidly secured to the impeller 4 and forms therewith a variable-volume chamber 14 communicating with a selector valve 18 by way of a hole 15, a passage 16 provided in the shaft 6, and a hydraulic fluid line 17. A space 19 in the torque converter 3 communicates via a passage 20 and a hydraulic fluid line 21 with the selector valve 18. The selector valve 18 comprises a body 22 and a spring-loaded spool 23. The valve body 22 has holes to receive the hydraulic fluid lines 17 and 21. The selector valve 18 is mechanically connected with a vehicle engine shaft speed pickup which is constructed in the form of a centrifugal governor 24. When actuated by the centrifugal governor 24, the spool 23 moves to close the hydraulic fluid lines 17 and 21. The selector valve 18 communicates through a hydraulic fluid line 25 with a pump 26 which is connected to a hydraulic fluid reservoir 27. A limiting valve 28 is connected to the hydraulic fluid line 25, bypassing the pump 26.

The interior of the torque converter 3 communicates via a hydraulic fluid line 29 and a limiting valve 30 with a hydraulic fluid cooler 31 which connects with the hydraulic fluid reservoir 27.

The transmission clutch 2 is engaged and disengaged by the agency a clutch operating arrangement 32 which includes a power cylinder 33 whose movable member 34 is mechanically connected with the pressure plate 35 of the transmission clutch 2. The movable member 34 is essentially a piston and will hereinafter be referred to as the piston 34.

The mechanical connection between the piston 34 and the pressure plate 35 is effected through a piston rod 36, a lever 37, a clutch release element 38 and a disk spring 39. The transmission clutch 2 has a driven disk 40 arranged to be clamped to the flywheel 7 by the pressure plate 35.

A space 41 in the power cylinder 33 communicates through a pipeline 42 with a valve 43. By the action of the valve 43 said space 41 is alternately connected to an air pressure source 44 and opened to the atmosphere through a throttling orifice 45.

The valve 43 is actuated by an electromagnet 47 which is fed from a storage battery 46 and is brought into action by a switch 48 connected with the gearchange lever 49 of a gearbox 50.

The space 41 in the power cylinder 33 also communicates with the atmosphere via a valve arrangement 51 which is connected to the positively controlled valve 43 and is actuated by the pressure of the hydraulic fluid in response to a signal from the centrifugal governor 24. The provision of the valve arrangement 51 makes is possible to reduce the time taken to engage the transmission clutch 2 when the vehicle is moving at comparatively high speeds. The valve arrangement 51 comprises a cylinder 52 accommodating a spring-loaded piston 53 with a piston rod 54. The piston 53 forms in the cylinder 52 a variable-volume space 55 communicating through a hydraulic fluid line 56 with the selector valve 18. The cylinder space 57 which accommodates the piston rod 54 is in constant communication with the atmosphere through a passage 58 and is separated by a valve 59, which is loaded by a spring 59a, from a space 60 communicating via a pipeline 61, the valve 43 and the pipeline 42 with the space 41 in the power cylinder 33. The space 60 is formed by a cover 62 and a part 63 rigidly attached to the cylinder 52.

In another embodiment of the invention, provision is made of a valve arrangement 65 (FIG. 2) whose cover 64 is made of a resilient material, viz. rubberized fabric. The cover 64 can also be made of other suitable materials. In this embodiment, the valve 59 is fixedly secured to the cover 64 and the spring 59a is fitted between the cover 64 and a part 66.

This constructional arrangement of the cover 64 makes it possible to improve the process of engaging the clutch when moving off the vehicle from rest.

A still further embodiment of the invention comprises a valve arrangement 67 (FIG. 3) wherein the cover 64 made of a resilient material directly closes the axial hole in the part 63 which is rigidly attached to the cylinder 52. A valve 68 is attached to the cover 64 on the side thereof remote from the axial hole in the part 63. The spring 59a is fitted between the valve 68 and the part 66.

The hydraulic transmission which constitutes the present invention operates as follows:

With the vehicle engine in operation, the driver begins to select the required speed in the gearbox 50 by the use of the gearchange lever 49, whereby the swtich 48 is brought into action. The contacts of the switch 48 close and electric current is applied to the winding of the electromagnet 47. The movable member 69 (FIG. 1) of the valve 43 connects the space 41 in the power cylinder 33 to the air pressure source 44 and the transmission clutch 2 becomes disengaged.

After the gearshift is completed, the driver releases the gearchange lever 49, the contacts of the switch 48 open and the winding of the electromagnet 47 is de-energized. Consequently, the movable member 69 of the valve 43 moves down (as shown), shutting off the air pressure source 44 and putting the space 41 in the power cylinder 33 in communication with the atmosphere through the throttling orifice 45, whereby the transmission clutch 2 is engaged.

Variation of the air pressure in the space 41 during clutch engagement is represented by a curve 1 in FIG. 4 wherein the symbols have the following meanings:

P = pressure in the space 41 in the power cylinder 33,
t = clutch engaging time,
$t_1$ = time point at which clutch engagement starts,
$t_1'$ = time point at which clutch engagement ends,
$P_1$ = pressure equal to that in the air pressure source 44,
$P_2$ = air pressure at which the pressure plate 35 takes up the clearance of the driven disk 40 and the clutch 2 starts transmitting frictional torque.

When moving off from rest, the transmission clutch has to be engaged smoothly in order to avoid jerky vehicle starting.

As the vehicle engine is accelerated, the speed of the torque converter impeller 4 and, consequently, of the torque converter turbine 5 communicated with driving wheels of the vehicle through the gearbox 50 increases.

In this manner the hydraulic transmission operates during the driveaway and initial movement of the vehicle.

For each subsequent gearchange in the gearbox 50, the clutch is disengaged and engaged as described above.

As the speeds of the engine and vehicle increase, the centrifugal governor 24 moves the spool 23 to the right (as shown), whereby the pressure of the hydraulic fluid is increased in the space 14 and decreased in the space 19.

As a result, the pressure plate 12 moves to the right, acting on the disk 11 and thereby locking together the torque converter impeller 4 and turbine 5.

Along with the rise of hydraulic fluid pressure in the space 14, fluid pressure builds up in the space 55 of the cylinder 52. This pressure build-up moves the piston 53 to the right and the piston rod 54 moves the valve 59 in the same direction, whereby the space 60 and the space 41 connected therewith during clutch engagement are opened to the atmosphere through the passage 58.

In this speed range and at higher road speeds, disengagement of the transmission clutch 2 for making gearchange in the gearbox 50 is effected as described previously. However, clutch engagement upon completion of gearchange is effected much faster inasmuch as the air under pressure issues from the space 41 in the power cylinder 33 through the throttling orifice 45 and also, with the valve 59 open, through the passage 58.

These clutch engagement conditions are represented by the curve 2 in FIG. 4. Owing to faster engagement of the transmission clutch, slip is reduced substantially with consequent increase in reliability and life of the hydraulic transmission. Furthermore, the duration of power flow interruption after gearchange is reduced by the difference $t_1' - t_2'$, where $t_2'$ is the time point at which clutch engagement ends with the valve arrangement 51 in operation.

With the embodiment employing a resilient cover 64, the process of engaging the transmission clutch 2 after gearchange in the gearbox 50 (when the vehicle is moving with the torque converter in direct drive) is also indicated by the curve 2 since the valve 59 is open.

However, in moving off, when the pressure of the hydraulic fluid in the space 55 is zero, the decrease of air pressure in the power cylinder space 41 to the value $P_2$ is characterized by the curve 2. Further pressure drop from $P_2$ to zero will be as shown by the curve 3.

This is attributed to the fact that during transmission clutch engagement, when the air pressure in the space 60 changes from $P_1$ to $P_2$, said pressure, acting on the resilient cover 64, overcomes the load of the spring on the valve 59 and unseats the valve 59 from the part 63.

During pressure drop from $P_2$ to zero the valve 59 is tightly seated on the part 63. Therefore, during transmission clutch engagement air pressure is released from the space 41 of the power cylinder 33 into the atmosphere only through the throttling orifice 45.

As stated earlier, the transmission clutch 2 starts transmitting torque only when the pressure in the space 41 has dropped below $P_2$.

Therefore, the described process of transmission clutch engagement in starting the vehicle cannot cause jerks, whereas the total time to engage the transmission clutch 2 is decreased by the difference $t_1' - t_3'$ where $t_3'$ is the time point at which clutch engagement ends when moving off from rest.

Ten heavy-duty truck hydraulic transmissions constructed according to the present invention have been thoroughly tested under various climatic and mountainous terrain conditions. The tests have proved high operating characteristics of the hydraulic transmission, particularly reliability and long life of the transmission clutch.

What is claimed is:

1. A vehicle hydraulic transmission comprising: a transmission clutch, a hydraulic torque converter, said transmission clutch and hydraulic torque converter being kinematically connected with each other; a direct drive clutch provided in said hydraulic torque converter for the purpose of locking together the impeller and turbine thereof; a vehicle engine shaft speed pickup, said direct drive clutch being actuated by hydraulic fluid pressure in response to a signal from said pickup; a transmission clutch engaging and disengaging arrangement having a power cylinder whose movable member is mechanically connected with the operating member of the transmission clutch, an air pressure source, and a positively controlled valve designed for the power cylinder to be alternately connected to said air pressure source and opened to the atmosphere through a throttling orifice; a valve arrangement connected through said positively controlled valve to the power cylinder for the latter to have a further provision for communication with the atmosphere, said valve arrangement being actuated by hydraulic fluid pressure in response to a signal from said vehicle engine shaft speed pickup.

2. A vehicle hydraulic transmission as claimed in claim 1, characterized in that the valve arrangement comprises a cylinder accommodating a piston with a piston rod, there being provision for hydraulic fluid to be fed under pressure into the piston end of said cylinder, whereas the rod end of the cylinder is in constant communication with the atmosphere and a spring-loaded valve adapted to interact with the free end of the piston rod is provided for the purpose of separating said rod end of the cylinder from a space formed by the cylinder and a cover fitted thereto, said space being in communication with the power cylinder.

3. A vehicle hydraulic transmission as claimed in claim 2, characterized in that said cover is made of a resilient material and is rigidly connected to the spring-loaded valve.

* * * * *